Dec. 12, 1939.　　　　D. O. FORD　　　　2,183,096
MATCH HOLDER
Filed Jan. 22, 1938
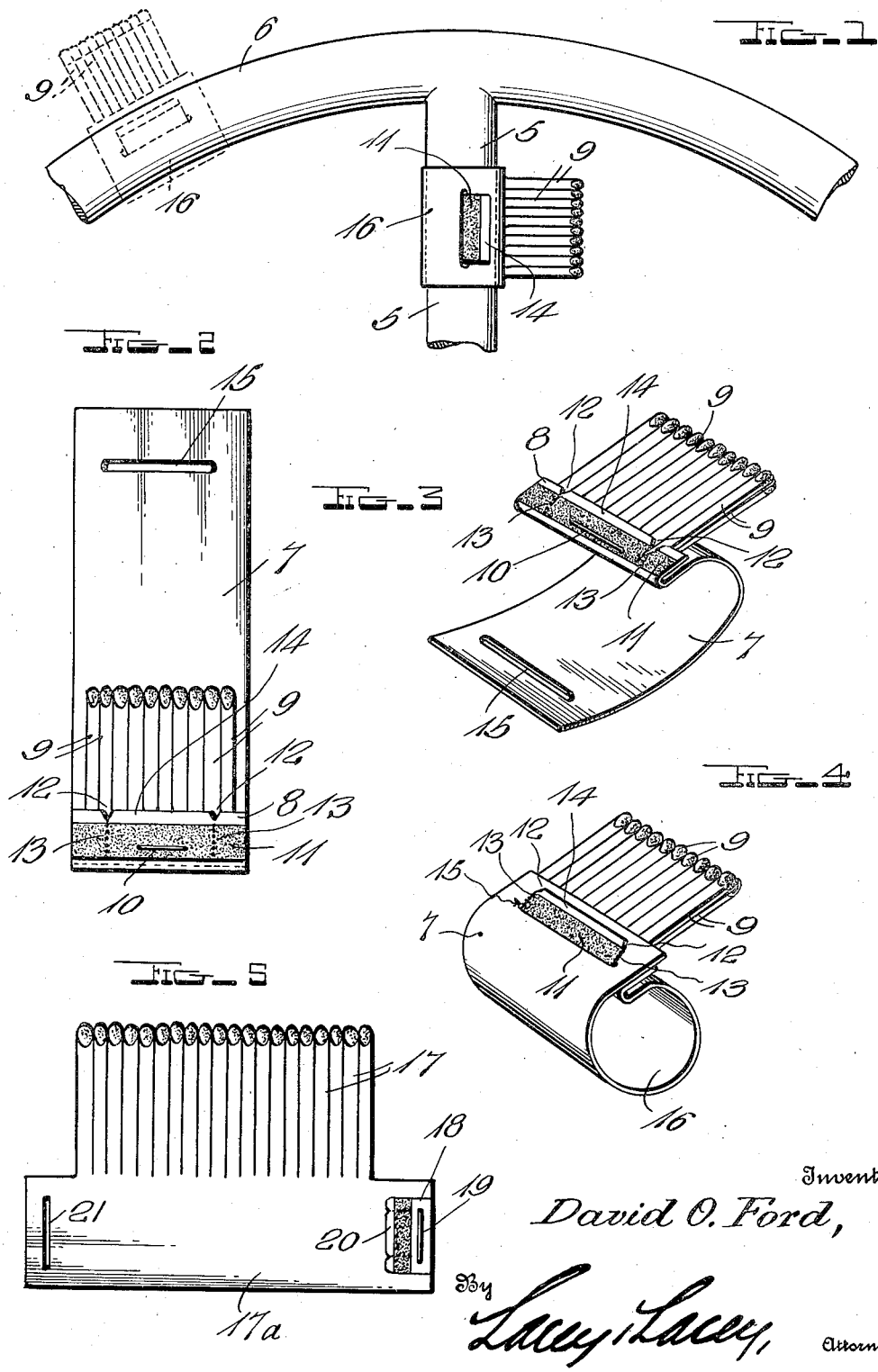
Inventor
David O. Ford,
By
Lacey & Lacey,
Attorneys Patented Dec. 12, 1939

2,183,096

UNITED STATES PATENT OFFICE 2,183,096

MATCH HOLDER

David O. Ford, Colonial Heights, Va., assignor of one-half to Joseph Mills Hanson, Colonial Heights, Va.

Application January 22, 1938, Serial No. 186,451

6 Claims. (Cl. 206—29)

This invention relates to match books and has for its object to provide a comparatively simple and inexpensive device of this character capable of being readily attached to the steering wheel of an automobile or to any other suitable support and by means of which a book of matches may be conveniently supported within easy reach of the driver of the automobile for immediate use when it is desired to light a cigar or cigarette and thus obviate the necessity of searching for a match or supporting a match book in the hand of the user when detaching and lighting the individual matches thereof.

A further object of the invention is to provide a match book, the cover of which is adapted to be flexed rearwardly to form a supporting loop to receive the rim or spoke of an automobile steering wheel, the opposite ends of said cover being provided with interengaging parts for locking the match book in a set position on the steering wheel.

A further object is to provide the striking or ignition surface of the match carrier with spaced incisions or perforations defining a locking lip and to form the free end of the carrier with a transverse slot adapted to receive the locking lip whereby, when the parts are interengaged, the ignition surface will be exposed to permit the striking of a match thereon.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a top plan of a portion of an automobile steering wheel showing in full lines one of the improved match books supported on a spoke of the steering wheel and in dotted lines a match book supported on the rim of the wheel, Figure 2 is a front elevation showing the cover of the book in opened or extended position, Figure 3 is a perspective view showing the cover of the book flexed rearwardly in the act of forming a supporting loop, Figure 4 is a similar view showing the opposite ends of the cover interengaged to complete the supporting loop, and Figure 5 is a plan view illustrating a modified form of the invention.

The improved match book forming the subject-matter of the present invention may be attached to any suitable support, and in Figure 1 of the drawing is shown in full lines encircling one of the spokes 5 of a steering wheel and in dotted lines encircling the rim 6 thereof. The device comprises a flexible cover or match carrier 7 formed of paper, cardboard or other flexible material, said cover or carrier having one end thereof folded upon itself to form a securing flange 8 between which and the adjacent portion of the cover is interposed a bank or gang of paper matches 9, the parts being rigidly secured together by means of a staple or similar fastening device 10. The securing flange is provided with a coating of ignition material 11 constituting a striking surface for the matches and the upper or free edge of said flange is provided with spaced substantially V-shaped notches 12 having vertical incisions or perforations 13 communicating therewith and extending for the major portion of the width of the securing flange 8, said perforations defining an intermediate locking lip 14. The opposite or free end of the cover or carrier 7 is provided with a transverse slot 15 adapted to receive the locking lip 14 for the purpose of securing the match book in position on the steering wheel.

In applying the match book to a steering wheel, the upper or free end of the carrier is flexed rearwardly around the spoke or rim of the steering wheel and the perforations 13 severed or partially severed to form the locking lip, after which the free end of the locking lip 14 passed through the slot 15 to form a loop 16 which frictionally engages the rim or spoke of the steering wheel and locks the match book in a set position thereon. It will here be noted that the loop 16 is under tension and that the locking lip 14 will consequently bear against the upper wall of the slot 15 and prevent accidental displacement of the match book. It will, furthermore, be noted that, inasmuch as the ignition surface 11 partially covers the locking lip 14, when said locking lip engages the slot 15, the ignition surface will be exposed so as to permit the driver of the automobile to conveniently strike a match thereon when it is desired to light a cigar or cigarette, as best shown in Figure 3 of the drawing. When the match book is not in position on the steering wheel, the free end of the cover or carrier is folded downwardly over the matches 9 and in which position the book of matches may be conveniently carried in the pocket in the usual manner.

In Figure 5 of the drawing, there is illustrated a modified form of the invention in which the paper matches 17 are formed integral with and project laterally from one longitudinal edge of the cover or carrier 17a instead of extending in the longitudinal plane of said cover. In the modified form of the device, one end of the cover or match carrier 17ª is provided with a flange 18 folded inwardly on the cover 17ª and secured thereto by a staple 19. The flange 18 is provided with perforations and notches defining a locking lip 20 adapted to enter a transverse slot 21 so that the cover can be flexed rearwardly and supported in the manner before described.

A match book constructed in accordance with the present invention may be conveniently supported on the steering wheel or other part of an automobile so as to be within easy reach of the driver for immediate use when it is desired to light a cigar or cigarette and thus obviate the necessity of searching for a match or grasping a standard match book in the hand of the user when detaching and lighting the individual matches thereof.

As the perforated portion 13 of the ignition surface is not severed until the match book is applied to the steering wheel, said ignition surface will be normally smooth and uninterrupted so as to permit lighting of matches in the usual manner without liability of heads of the matches catching on the locking lip.

It will, of course, be understood that the devices may be made in different sizes and shapes and, if desired, the front and rear of the cover or carrier may be utilized for advertising purposes.

Having thus described the invention, what is claimed as new is:

1. A match book comprising a plurality of matches, a carrier for said matches secured at one end to base portions of the matches and adapted to be reversely rolled upon itself longitudinally of the matches to form a loop for engagement about a support, a locking tongue on one end of the carrier, and a slot formed in the other end of the carrier and adapted to receive the locking tongue for holding the loop under tension in engagement with said support and mounting the matches in position to extend transversely of the support and project laterally from one side thereof.

2. A match book comprising a plurality of matches, a flexible carrier for said matches adapted to be rolled to form a loop for engagement with a support, one end of the carrier being provided with a striking surface having spaced weakened portions therein defining a locking tongue and the other end of the carrier being provided with a slot adapted to receive said tongue for locking the loop in engagement with said support.

3. A match book comprising a plurality of matches, a flexible carrier for said matches adapted to be rolled rearwardly to form a loop for engagement with a support, one end of the carrier being folded upon itself to form a securing flange having spaced notches formed therein, a match striking surface on said securing flange, there being weakened portions formed in the securing flange and intersecting the notches to form an intermediate locking tongue, and a slot formed in the other end of the carrier and adapted to receive the locking tongue.

4. A match book comprising a plurality of matches, a flexible carrier for said matches adapted to be bent rearwardly away from the matches to form a loop for engagement with the support, one end of the carrier being provided with a match striking surface having spaced weakened portions formed therein defining an intermediate locking tongue, there being a slot formed in the other end of the carrier and adapted to receive the tongue and expose the match striking surface at said tongue.

5. A match book comprising a plurality of matches, a flexible carrier for said matches adapted to be reversely coiled upon itself to form a loop for engagement with a support, one end of the carrier being provided with a slot and the other end thereof with a locking tongue coated with an ignition compound visible through the slot when the tongue and slot are interengaged.

6. A match book comprising a gang of matches, a flexible cover having one end thereof folded over the matches to form a securing flange having its free edge provided with spaced notches and its outer surface coated with match striking material, a fastening device extending through the securing flange and matches, there being spaced rows of perforations formed in the securing flange and intersecting the notches to form an intermediate locking tongue, the other end of said cover being provided with a transverse slot adapted to receive the locking tongue, the free end of the cover being adapted to be rolled rearwardly to form a loop for engagement with a support.

DAVID O. FORD.